United States Patent [19]
Bonneau et al.

[11] Patent Number: 5,994,260
[45] Date of Patent: Nov. 30, 1999

[54] CERIUM OXIDE WITH PORES HAVING A LAMELLAR STRUCTURE, PREPARATION METHOD THEREFOR AND USE THEREOF IN CATALYSIS

[75] Inventors: Lionel Bonneau, Cran-Gevrier; Patrick Ferlin, Paris; Christophe Zing, Leimbach, all of France

[73] Assignee: Rhodia Chimie, Courbevoie, France

[21] Appl. No.: 09/077,812

[22] PCT Filed: Dec. 3, 1996

[86] PCT No.: PCT/FR96/01918

§ 371 Date: Mar. 1, 1999

§ 102(e) Date: Mar. 1, 1999

[87] PCT Pub. No.: WO97/20772

PCT Pub. Date: Jun. 12, 1997

[30] Foreign Application Priority Data

Dec. 4, 1995 [FR] France ................................. 95/14291

[51] Int. Cl.⁶ .............................. B01J 25/00; B01J 20/34; B01J 21/04; B01J 8/02; C04B 35/50
[52] U.S. Cl. ........................... 502/304; 502/55; 502/38; 502/302; 502/527.14; 502/527.16; 502/439; 423/213.2; 106/415; 501/152
[58] Field of Search ..................... 502/302, 304, 502/527.14, 527.16, 527.24, 439, 34, 38, 51, 55, 56; 423/213.2; 106/415; 501/152

[56] References Cited

U.S. PATENT DOCUMENTS

| | | |
|---|---|---|
| 3,185,652 | 5/1965 | Kleber et al. ........................... 502/302 |
| 3,200,084 | 8/1965 | Callahan et al. ......................... 502/304 |
| 4,714,694 | 12/1987 | Wan et al. .............................. 502/304 |
| 5,061,560 | 10/1991 | Tajima et al. ........................... 428/357 |
| 5,081,095 | 1/1992 | Bedford et al. ......................... 502/439 |
| 5,205,837 | 4/1993 | Andrean et al. ........................... 8/405 |
| 5,280,002 | 1/1994 | Bonneau et al. ......................... 502/202 |
| 5,389,352 | 2/1995 | Wang ...................................... 423/263 |
| 5,480,854 | 1/1996 | Rajaram et al. ......................... 502/304 |
| 5,491,120 | 2/1996 | Voss et al. ............................ 502/304 |
| 5,525,307 | 6/1996 | Yasaki et al. ........................... 422/171 |
| 5,607,892 | 3/1997 | Chopin et al. .......................... 502/304 |
| 5,652,192 | 7/1997 | Matson et al. .......................... 502/304 |
| 5,733,837 | 3/1998 | Nakatsuji et al. ...................... 502/304 |
| 5,747,401 | 5/1998 | Cuif ...................................... 501/103 |
| 5,814,577 | 9/1998 | Park et al. ............................ 502/304 |
| 5,914,287 | 6/1999 | Saito et al. ........................... 501/152 |

Primary Examiner—Mark L. Bell
Assistant Examiner—Patricia L. Hailey
Attorney, Agent, or Firm—John A. Shedden

[57] ABSTRACT

A cerium oxide with pores having a uniform lamellar structure. The pores may be at least partially arranged in substantially parallel directions and may also extend throughout the grain. The method for preparing said cerium oxide comprises heat treating a compound that essentially consists of cerium carbonate octahydrate. The atmosphere in which the treatment is performed includes an air/steam or oxygen/steam mixture with a steam volume fraction of at least 40%. Said cerium oxide is particularly useful as a catalyst, especially in motor vehicle post-combustion catalysis.

24 Claims, 2 Drawing Sheets

CERIUM OXIDE WITH PORES HAVING A LAMELLAR STRUCTURE, PREPARATION METHOD THEREFOR AND USE THEREOF IN CATALYSIS

The present invention concerns a cerium oxide with pores having a lamellar structure, a process for its preparation and its use in catalysis.

Cerium oxide, alone or in the presence of other metal oxides, is mainly used as a catalyst, in particular for treating automobile exhaust gases.

Good catalytic reactivity requires a cerium oxide with a large specific surface area which does not reduce by too great an extent when the oxide is subjected to high temperatures, for example of the order of 800° C.

In addition to the specific surface area, the pore characteristics can be important for the catalytic properties of a product. Thus the shape and distribution of the pores can have an influence on the contact between phases in the catalysis process. Further, a reduction in surface area with temperature is mainly die to gradual blocking of the pores and this phenomenon can be accelerated, depending on the shape of the pores.

The invention aims to provide a cerium oxide with specific pore characteristics.

The invention also aims to provide a process for producing this cerium oxide.

Thus the cerium oxide of the invention is characterized in that it has pores having a lamellar structure.

The invention also provides a process for preparing a cerium oxide with pores having a lamellar structure by heat treatment of a cerium carbonate, characterized in that a compound constituted essentially by an octahydrated cerium carbonate is heat treated.

Further characteristics, details and advantages of the invention will become more clear from the following description and accompanying drawings in which.

Figure 1:
FIG. 1 is an electron microscope photograph of a grain of cerium oxide of the invention.

The term "specific surface area" used in the remainder of the description means the BET specific surface area determined by nitrogen adsorption in accordance with the American standard ASTM D 3663-78 established using the BRUNAUER-EMMETT-TELLER method described in "The Journal of the American Society", 60, 309 (1938).

The pore volume and pore size are determined using well known techniques also employing the BET method. Reference should in particular be made to the publication "Adsorption, Surface Area and Porosity", Gregg and Sing, Academic Press, 1967, pp 160–172 and 174–177.

The principal characteristic of the cerium oxide of the invention is the structure of its pores. These are lamellar in structure. They are in the form of slits or channels with a substantially constant diameter. This is an essential difference over prior art cerium oxides, the pores of which are substantially spherical in structure.

A further characteristic of the oxide of the invention is that its pores can have a homogeneous structure. This means that at least the majority of the pores, more particularly substantially the totality thereof, have the same lamellar or channel structure.

In a additional feature of the oxide of the invention, at least a portion of the pores, more particularly substantially all of the pores, or in other words the lamellae or channels constituted by them, are oriented parallel to each other.

In a variation of the invention, at least a portion of the pores extend throughout the grain thickness. The term "grain" here means the cerium oxide particle obtained after deagglomeration of agglomerates. This arrangement of pores allows passage from one oxide grain surface to the other via the pores.

In a further advantageous variation of the invention, the pore distribution is unimodal. More particularly, the ratio $\sigma/m$ $(d_{84}-d_{16})/2d_{50}$ is at most 0.6, $d_n$ ($n=84$, 16 or 50) being defined as the diameter at which all of the pores with a diameter greater than that diameter constitute n% of the pore volume. More particularly, the ratio $\sigma/m$ can be at most 0.45 and in some cases, it can be at most 0.3.

The characteristics of the pore structure described above can be clearly seen in FIGS. 1 and 2.

It should also be mentioned that the cerium oxide of the invention can be essentially and more particularly completely constituted by cerium IV. The term "completely" means that X ray analysis of the oxide of the invention cannot detect any cerium III oxide.

The cerium oxide of the invention preferably has an average particle size in the range 10 to 50 μm.

Particular embodiments of the invention will now be described.

In the first embodiment, the oxide pores are mesoporous. This means that at least 70%, more particularly at least 80% and more particularly still at least 90% of the pore volume is taken up in pores with a diameter between 20 Å and 100 Å. The pore volume of the product is generally at most 0.30 cm$^3$/g, more particularly at most 0.25 cm$^3$/g. The minimum pore volume is normally at least 0.01 cm$^3$/g.

The specific surface area of the cerium oxide of the first embodiment can vary within a wide range. This surface area is generally at least 50 m$^2$/g. More particularly, this surface area is at least 150 m$^2$/g, more particularly still in the range 150 to 250 m$^2$/g. More particularly, the cerium oxide in this embodiment can be an oxide which has not been calcined or which has undergone a heat treatment at a temperature of at most 350° C.

In a second embodiment of the invention, the cerium oxide is characterized in that at least 70%, more particularly at least 80% of the pore volume is taken up by pores with a diameter in the range 100 to 300 Å. The pore volume of the product is generally at most 0.20 cm$^3$/g, more particularly at most 0.15 cm$^3$/g. The minimum pore volume is normally at least 0.01 cm$^3$/g.

This second embodiment is of particular application to an oxide which has undergone calcining in air at a temperature of over 350° C., in particular for 2 hours at 800° C. and, in the latter case, the oxide has a specific surface area of at least 15 m$^2$/g. More particularly, this surface area can be at least 40 m$^2$/g and more particularly still at least 60 m$^2$/g.

A process for preparing a cerium oxide with pores having a lamellar structure of the invention will now be described.

A first characteristic of this process is the starting product. This is essentially constituted by an octahydrated cerium carbonate with formula $Ce_2(CO_3)_3 \cdot 8H_2O$ or a carbonate with a degree of hydration which is very close, and in this case preferably over, to $8H_2O$. The carbonate has a lanthanite structure. The starting compound is preferably entirely octahydrated carbonate.

The process of the invention is also characterized by a heat treatment under specific conditions. These conditions are selected such that the octahydrated cerium carbonate can decompose to produce the oxide without dehydration of the carbonate and formation of a carbonate with a different degree of hydration.

The temperature of the treatment is the minimum temperature necessary to obtain carbonate decomposition. It is generally over 100° C. and more particularly at least 120° C. or 130° C. The maximum temperature is essentially fixed by the specific surface area desired for the oxide at the end of the treatment. In general, a temperature of 350° C. or even 300° C. is not exceeded. More particularly, a temperature in the range 130° C. to 150° C. is employed.

Heat treatment also takes place in a specific atmosphere which can keep the carbonate in is octahydrated form. This atmosphere comprises steam, more particularly an air/steam mixture or an oxygen/steam mixture, and the volume fraction of steam in this atmosphere is at least 40%. The volume fraction of steam is preferably at least 70%, more particularly at least 90%, and it can be in the range 95% to 99%. It should be noted here that it is possible to raise the temperature in air from ambient temperature to the temperature at which the heat treatment is to be carried out.

The treatment is carried out in any type of apparatus which can ensure that each particle of carbonate to be treated is in an environment in which the conditions just described above can be best achieved. Thus, in general, any reactor which can ensure good contact between the gas phase and the solid phase can be used. A fluidised bed type reactor is very suitable for carrying out the process. The reactor can be a piston type continuous reactor or a perfectly stirred continuous reactor or it can be discontinuous and in the latter case, it is ensured that stirring is as perfect as possible. The air/steam mixture or oxygen/steam mixture described above can constitute the fluidisation gas for the fluidised bed.

The residence times are calculated in known manner as a function of the reactor type and the treatment conditions employed.

Octahydrated cerium carbonate is a known product. It can be prepared by drying cerium carbonates with a higher degree of hydration, for example 15 to 22 $H_2O$. These carbonates are obtained by precipitation of a cerium salt such as a cerium nitrate with a carbonate such as ammonium carbonate. Drying can be effected by passing the carbonate through an atomiser or into a low temperature fluidised bed, for example at 50–60° C. in a stream of gaseous air. Conduction drying can also be carried out using a system of heating plates, for example at 70° C., with a residence time of 1 hour or 1.5 hours. Drying can also be carried out in a turbosphere.

The cerium oxide obtained after the heat treatment described above can then be calcined. The calcining temperature is selected as a function of the subsequent temperature at which the oxide will be used and taking account of the fact that the specific surface area of the calcined product is lower if the calcining temperature is high.

The cerium oxide of the invention can be used in different applications in particular as a filler, pigment or as a constituent of glass polishing compositions. In particular it can be used as a catalyst or can itself form part of the composition of a catalytic system.

The cerium oxide of the invention can be present in the form of a powder but it can optionally be used in the form of granules, beads, cylinders or honeycombs of differing dimensions depending on the desired use.

Further, in the case of catalysis, the cerium oxide can be applied to any support normally used in this field, such as $ZrO_2$, $Al_2O_3$, $TiO_2$ or $SiO_2$. The cerium oxide can also be used in catalytic systems comprising a wash coat based on this oxide, on a substrate which is, for example, a metallic or ceramic monolith. The wash coat may itself comprise a support of the type mentioned above.

The invention also concerns the use of a cerium oxide and a catalytic system as described above for the production of a catalyst for automobile post combustion.

Finally, the invention concerns the use of the cerium oxide or these catalytic systems for catalysis of automobile post combustion.

For these catalytic uses, the cerium oxide of the invention can be used in combination with precious metals. The nature of these metals and techniques for incorporating them are well known to the skilled person. As an example, the metals can be platinum, rhodium, palladium, ruthenium or iridium, and can in particular be incorporated by impregnation.

Non limiting examples will now be described.

In these examples, measurements of pore volume, pore size and pore distribution were carried out using a Micromeritics® Asap 2000 apparatus.

EXAMPLE 1

A moist cerium carbonate with a loss on ignition (LOI) of 60% was oven dried in dry air for 24 hours at 50° C.

The dry carbonate obtained—LOI 46.1%—as a thin layer of a few millimetres thick underwent treatments in different streams (HSV 10000 l/l/h); the characteristics are shown in the Table below.

| Example | Temperature | Water/oxygen/nitrogen, composition by volume | Duration |
| --- | --- | --- | --- |
| 1-1 | 150° C. | 60/3/37 | 2 h |
| 1-2 | 150° C. | 70/3/27 | 2 h |
| 1-3 | 150° C. | 90/3/7 | 2 h |
| 1-4 | 150° C. | 95/3/2 | 2 h |
| 1-5 comparative | 108° C. | 30/0.1/69.9 | 6 h |

The cerium oxides obtained had the characteristics given below. The specific surface areas given are the surface area of the product before calcining, i.e., after heat treatment at the temperature given above, and the surface area after calcining at 800° C. for 2 hours.

| Example | Specific surface area ($m^2/g$) before/after calcining | Pore volume (20–1000Å) $cm^3/g$ | % of pore volume (20–100Å) $cm^3/g$ | Average pore size Å | $\sigma/m$ |
| --- | --- | --- | --- | --- | --- |
| 1-1 | 185/35 | 0.19 | 92 | 33 | 0.30 |
| 1-2 | 190/44 | 0.20 | 94 | 37 | 0.32 |
| 1-3 | 180/41 | 0.22 | 92 | 38 | 0.22 |
| 1-4 | 195/36 | 0.21 | 94 | 33 | 0.27 |
| 1-5 comparative | 89/21 | 0.10 | 86 | 42 | 0.48 |

The product of Example 1–5 had pores with a spherical structure and not a lamellar structure as in the case of the other products. After treatment at 800° C. for 2 hours, it had a specific surface area of 21 $m^2/g$ and a pore volume in the region 50–1000 Å of 0.11 $cm^3/g$, 62% of the pore volume being constituted by pores in the region 100–300 Å, the pore distribution being characterized by a $\sigma/m$ of 0.62 and an average size of 135 Å.

EXAMPLE 2

A Ce carbonate—LOI 60% —was oven dried in dry air for 24 hours at 50°C.

The dry carbonate obtained—LOI 44.2%—as a thin layer several millimetres thick, then underwent heat treatment in a 150° C. stream (HSV 1000000 l/l/h) of a gas constituted by steam and air with a composition by volume of 72/28 for 1 hour 30 minutes.

The cerium oxide obtained had a specific surface area of 206 m$^2$/g and a pore volume in the 20–1000 Å region of 0.24 cm$^3$/g; 92% of the pore volume was constituted by pores in the region 20–100 Å; the pore distribution was characterized by a σ/m of 0.41 and an average size of 35 Å.

Figure 2:
FIG. 2 is an electron microscope photograph at a higher magnification of a portion of a grain of cerium oxide of the invention.

FIGS. 1 and 2 illustrate the particular structure of the lamellar structured pores of the product obtained.

After treatment at 800° C. for 2 hours, the cerium oxide had a specific surface area of 37 m$^2$/g and a pore volume in the 50–1000 Å region of 0.12 cm$^3$/g; 76% of the pore volume was constituted by pores in the 100–300 Å region; the pore distribution was characterized by a σ/m of 0.33 and an average size of 139 Å.

Heat treatment of the same dry carbonate was carried out modifying only the steam/air ratio which became 90/10. The product obtained had a specific surface area of 183 m$^2$/g. After calcining at 800° C. for 2 hours, this surface area was 47 m$^2$/g.

COMPARATIVE EXAMPLE 3

The procedure of Example 2 was followed but using an atmosphere of 100% air. The surface area of the product obtained was 110 m$^2$/g. This surface, after calcining at 800° C. for 2 hours, was 3 m$^2$/g. This product had a spherical pore structure.

EXAMPLE 4

A Ce carbonate with a LOI of 60% underwent conduction drying on a stainless steel plate at 70° C. for 75 minutes.

The carbonate obtained—LOI 43.1%—as a thin layer a few millimetres thick, then underwent the following heat treatment: heated to 150° C. in a stream of air for 10 minutes, then held at 150° C. for 1 hour 30 minutes in a stream (HSV 1000000 l/l/h) of a gaseous mixture constituted by steam and air in a ratio of 90/10 by volume.

The cerium oxide obtained—LOI 6.4% —had a specific surface area of 185 m$^2$/g and 75 m$^2$/g after treatment at 800° C. for 2 hours.

EXAMPLE 5

A moist cerium carbonate—LOI 60%—was oven dried in dry air for 24 hours at 50° C.

The dry carbonate obtained—LOI 46.1%—then underwent treatment in a steam/air mixture comparable to Example 3.

The cerium oxide obtained had a specific surface area of 207 m$^2$/g and 44 m$^2$/g after treatment at 800° C. for 2 hours.

EXAMPLE 6

A moist cerium carbonate—LOI 60%—was dried by fluidisation in dry air at 50° C. for 45 minutes.

The dry carbonate obtained—LOI 44.4%—then underwent the same treatment as that described in the two preceding examples.

The oxide obtained—LOI 5%—developed a surface area of 178 m$^2$/g and 63 m$^2$/g after treatment at 800° C. for 2 hours.

EXAMPLE 7

A moist cerium carbonate—LOI 60%—was dried by fluidisation in dry air at 50° C. for 45 minutes.

The dry carbonate obtained—LOI 43%—was fluidised in a steam/air mixture with a 90/10 by volume composition at 150° C. for 3 hours 25 minutes. The fluidisation rate was 0.1 m/second.

The cerium oxide obtained had a specific surface area of 190 m$^2$/g and a pore volume in the 20–1000 Å region of 0.23 cm$^3$/g; 88% of the pore volume was constituted by pores in the 20–100 Å region; the pore distribution was characterized by a σ/m of 0.58 and an average size of 37 Å.

After treatment at 800° C. for 2 hours, the cerium oxide had a specific surface area of 44 m$^2$/g and a pore volume in the 50–1000 Å region of 0.13 cm$^3$/g; 80% of the pore volume was constituted by pores in the 100–300 Å region; the pore distribution was characterized by a σ/m of 0.32 and an average size of 171 Å.

EXAMPLE 8

A moist cerium carbonate—LOI 60%—was oven dried in dry air for 24 hours at 50° C.

The dry carbonate obtained—LOI 44.2%—in a thin layer a few millimetres thick, underwent heat treatment consisting of heating from 120° C. to 300° C. at a heating rate of 80° C./h in a stream (HSV 1000000 l/l/h) of a gas constituted by steam and air in a composition of 71/29 by volume.

The compound obtained had a specific surface area of 214 m$^2$/g, and after treatment at 800° C. for 2 hours, a specific surface area of 14.5 m$^2$/g.

What is claimed is:

1. A cerium oxide grain exhibiting pores having a lamellar structure.

2. A cerium oxide grain according to claim 1, wherein the pores further have a homogeneous structure.

3. A cerium oxide grain according to claim 1, wherein at least a portion of the pores are oriented substantially parallel to each other.

4. A cerium oxide grain according to claim 1, wherein at least a portion of the pores extend through the entire grain.

5. A cerium oxide grain according to claim 1, having a unimodal pore distribution.

6. A cerium oxide grain according to claim 5, wherein said pore distribution has a ratio σ/m of at most 0.6, σ/m being defined by the ratio $(d_{84}-d_{16})/2d_{50}$ wherein $d_n$, where n=84, 16 or 50, represents a diameter such that all pores with a diameter higher than that diameter constitute n% of the pore volume.

7. A cerium oxide grain according to claim 1, wherein the pores present a pore volume where 70% of said pore volume is taken up by pores with a diameter in the range 20 Å to 100 Å.

8. A cerium oxide grain according to claim 7, wherein said grain has a specific surface area of at least 150 m$^2$/g.

9. A cerium oxide grain according to claim 8, wherein said grain has a specific surface in the range 150 m$^2$/g to 200 m$^2$/g.

10. A cerium oxide grain according to claim 1, wherein the pores present a pore volume where 70% of said pore volume is taken up by pores with a diameter in the range 100 Å to 300 Å.

11. A cerium oxide grain according to claim 10, having a specific surface area of at least 15 m$^2$/g.

12. A cerium oxide grain according to claim 1, wherein said grain does not contain cerium III oxide.

13. A cerium oxide grain according to claim 1, wherein said grain has a pore volume of at most 0.30 cm$^3$/g.

14. A process according claim 1, wherein said heat treatment is carried out in a fluidised bed reactor.

15. A catalytic system, comprising a cerium oxide grain as defined in claim 1.

16. A catalytic system, comprising a wash coat based on a cerium oxide grain as defined in claim 1.

17. A catalyst for automobile post combustion, comprising a wash coat based on a cerium oxide grain as defined in claim 16.

18. A process for the preparation of a catalyst for automobile post combustion, comprising the step of using a catalytic system, comprising a wash coat based on a cerium oxide grain as defined in claim 16.

19. A catalyst for automobile post combustion, comprising a cerium oxide grain as defined in claim 1.

20. A process for the preparation of a catalyst for automobile post combustion, comprising the step of using a cerium oxide grain as defined in claim 1.

21. A process for preparing a cerium oxide with pores having a lamellar structure by heat treatment of a cerium carbonate, comprising the step of heat treating a compound consisting essentially of an octahydrated cerium carbonate under conditions which enable decomposition of the carbonate without dehydration thereof and formation of a carbonate with a different degree of hydration and in an atmosphere comprising steam in s volume fraction of steam of at least 40%.

22. A process according to claim 21, wherein the atmosphere comprises an air/steam mixture or oxygen/steam mixture.

23. A process according to claim 22, wherein said atmosphere is an air/steam mixture with a steam volume fraction of at least 70%.

24. A process according to claim 21, wherein said compound is heat treated at a temperature of over 100° C.

* * * * *